United States Patent [19]
Koike

[11] Patent Number: 4,457,111
[45] Date of Patent: Jul. 3, 1984

[54] SEALING STRUCTURE FOR A MOVABLE WINDOW

[75] Inventor: Shoichi Koike, Tokyo, Japan

[73] Assignee: Nissan Motor Company, Limited, Yokohama, Japan

[21] Appl. No.: 386,426

[22] Filed: Jun. 8, 1982

[30] Foreign Application Priority Data

Jun. 26, 1981 [JP] Japan ............................ 56-100093

[51] Int. Cl.³ .......................... E05D 15/16; E06B 7/16
[52] U.S. Cl. ..................................... 49/441; 49/448; 49/502; 296/146
[58] Field of Search ................. 49/502, 374, 348, 166, 49/440, 441, 488; 296/146

[56] References Cited

U.S. PATENT DOCUMENTS

| | | | |
|---|---|---|---|
| 2,024,773 | 12/1935 | Lohrman | 49/374 |
| 2,941,838 | 6/1960 | Wernig | 49/166 |
| 3,286,389 | 11/1966 | Draplin et al. | 49/441 |
| 3,600,858 | 8/1971 | Savell | 49/488 |
| 4,240,227 | 12/1980 | Hasler et al. | 49/348 |
| 4,348,046 | 9/1982 | Ohya | 49/502 X |

FOREIGN PATENT DOCUMENTS

| | | |
|---|---|---|
| 40588 | 11/1981 | European Pat. Off. . |
| 701412 | 1/1941 | Fed. Rep. of Germany . |
| 2808235 | 8/1979 | Fed. Rep. of Germany . |
| 2809721 | 9/1979 | Fed. Rep. of Germany . |
| 2826949 | 1/1980 | Fed. Rep. of Germany . |
| 2827372 | 1/1980 | Fed. Rep. of Germany . |
| 2847404 | 5/1980 | Fed. Rep. of Germany . |
| 1327861 | 4/1963 | France ................................ 49/166 |
| 2078839 | 1/1982 | United Kingdom . |

*Primary Examiner*—Philip C. Kannan
*Attorney, Agent, or Firm*—Schwartz, Jeffery, Schwaab, Mack, Blumenthal & Koch

[57] ABSTRACT

A sealing structure for a movable window allows a movable windowpane to lie flush with the outside of the window sill frame. The vertical edges of the windowpane are provided with projecting guides which have a runner lying somewhat offset from the plane of the rest of the pane. The guide runners are supported by elastic seals such that the pane lies flush with the outer surface of the window sill frame. A vibration damper in the shape of an inverted "V" may be provided at the top of the window sill frame in order to guide the top edge of the pane into place and to prevent the pane from vibrating excessively.

4 Claims, 9 Drawing Figures

SEALING STRUCTURE FOR A MOVABLE WINDOW

BACKGROUND OF THE INVENTION

The invention pertains to a sealing structure for a movable window in an automotive vehicle, and particularly to a sealing structure which permits a movable windowpane to lie flush with its frame without detracting from its appearance.

A common feature of doors of automotive vehicle is a window which can be raised and lowered at will. The windowpane follows a track defined by vertical legs of a window sill within the door frame, and the top edge of the pane engages the top horizontal leg of the sill. The sill is normally lined with an elastic material which simultaneously protects the glazing from damage due to vibration, seals the edges of the window and facilitates the sliding movement of the windowpane.

In the most common type of movable window, however, the edges of the windowpane are centered in the side and top elastic sealing liners so that the outer surface of the pane is offset noticeably from the plane of the window sill. Not only does this detract from the overall appearance of the window, it also disrupts the laminar flow of air around the vehicle body, resulting in unnecessary aerodynamic drag and unpleasant noise.

The object of the invention is to provide a sealing structure for a movable window which permits the windowpane to lie flush with the window sill without detracting from the appearance or quiet operation of the window.

SUMMARY OF THE INVENTION

The invention provides a sealing structure for a movable window which includes guide means fixed to the windowpane, projecting beyond the edges thereof parallel to the direction in which the pane is moved and having a runner offset toward the longitudinal axis of the vehicle from the pane. The guide runner engages elastic sealing means which allows the guide to slide easily and quietly therealong whereby the pane is held flush with the outer surface of the vehicle. The sealing structure further includes vibration damper means fixed to the window sill to guide the pane into place when the windowpane closes while damping the vibration thereof.

BRIEF DESCRIPTION OF THE DRAWINGS

Like reference numerals denote similar elements throughout the drawings, which should not be taken as limitative of the invention but are for the purposes of exemplary illustration only.

DETAILED DESCRIPTION OF THE PREFERRED EMBODIMENTS

Throughout the following description, the term "inward" and the like will be used to mean "toward the longitudinal axis of the vehicle"; "outward" will imply the opposite direction.

Figure 1:
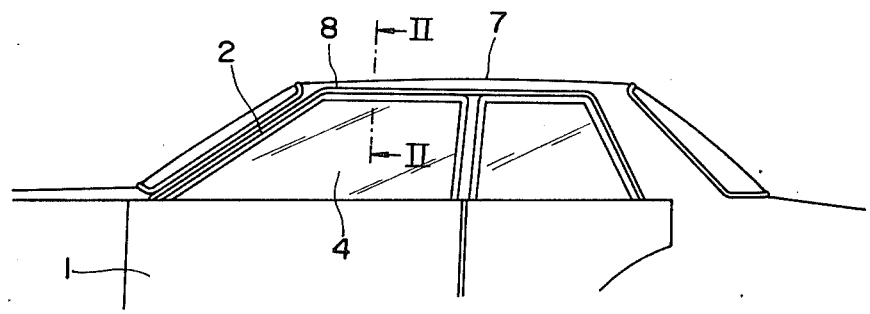
FIG. 1 is an elevation view of a portion of a vehicle body including a typical door window sill.
Figure 2:
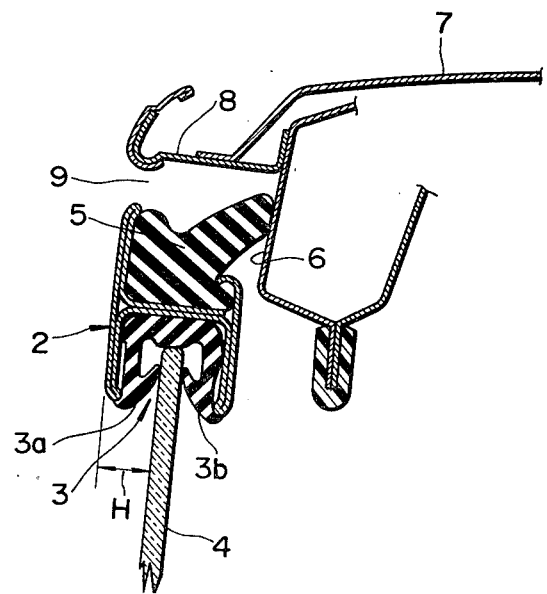
FIG. 2 is a cross-sectional view taken along line II—II in FIG. 1, showing a prior art sealing structure.

In order to clearly illustrate the need and advantage of the present invention, a prior art sealing structure will be described with reference to FIGS. 1 and 2. A vehicle door 1 includes a window sill frame 2 lined with a seal or an elastic sealing member 3. The edges of a pane 4 of window glazing are received within the elastic sealing member 3. Sill frame 2 also supports door weather stripping 5 which sealingly abuts the door frame 6 of the vehicle body when door 1 is closed. Reference numeral 7 denotes a roof panel, and numeral 8 denotes a rain gutter panel.

Sealing member 3 includes outward and inward lips $3a$ and $3b$, respectively, which allow the pane 4 to pass between them, but are biassed to intimately contact the pane 4 when it is within seal 3. Thus, lips $3a$ and $3b$ tend to hold pane 4 centered within seal 3 so that the outward surface of pane 4 is offset from the outward surface of sill frame 2 by a distance H. This offset leads to the previously-described drawbacks of the prior art.

Figure 3:
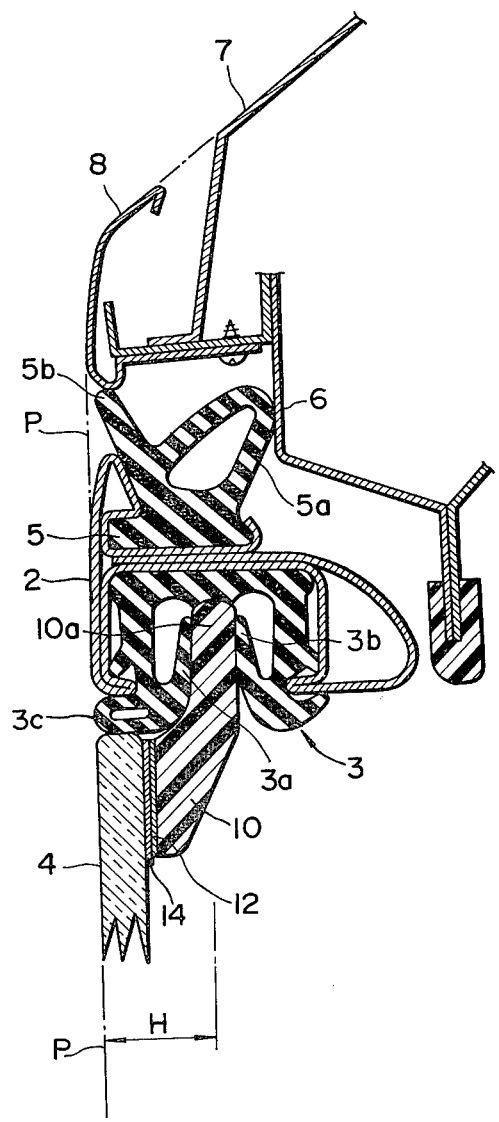
FIG. 3 is a cross-sectional view similar to FIG. 2 of a first example of a sealing structure.

An example of a sealing structure for a movable window is illustrated in FIG. 3. A rigid guide member 10, extending along the upper and front oblique edge of the pane, is fixed to the edge of the inward surface of pane 4 by means of a layer of adhesive 12. For the sake of appearance, a layer of tint or dye 14 may be provided between pane 4 and adhesive 12. Guide 10 extends beyond the upper edge of pane 4 and curves to form a runner $10a$ parallel to pane 4 and offset inward therefrom by distance H. Runner $10a$ is received within seal 3 between lips $3a$ and $3b$ so that pane 4 now is held flush with the surface P of sill frame 2.

Seal 3 is similar to that of the prior art except for an additional pad $3c$ which acts as a buffer between the edge of pane 4 and the edge of sill frame 2. Pad $3c$ may be hollow to enhance its elasticity.

FIG. 3 also shows some changes to weather stripping 5. An inward projection $5a$ forms a seal in conjunction with door frame 6, as in FIG. 2. An outward projection $5b$ forms a seal in conjunction with rain gutter panel 8 and sill frame 2.

Figure 4:
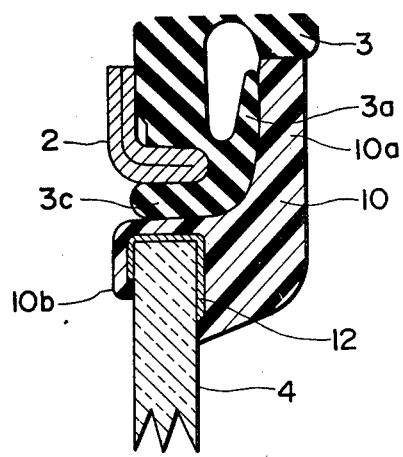
FIG. 4 is a slightly enlarged cross-sectional view similar to FIG. 2 of a second example of a sealing structure.

FIG. 4 shows a second example of guide member 10. A bonding surface $10b$ extends from the base of guide 10 around the upper edge of pane 4 and slightly along the outward surface of pane 4. Similarly, the layer of adhesive 12 follows the contour of bonding surface $10b$. Bonding surface $10b$ should be as thin as possible, so as to minimize its effect on air flow across the window while still strengthening the attachment of guide 10 to pane 4.

Figure 5:
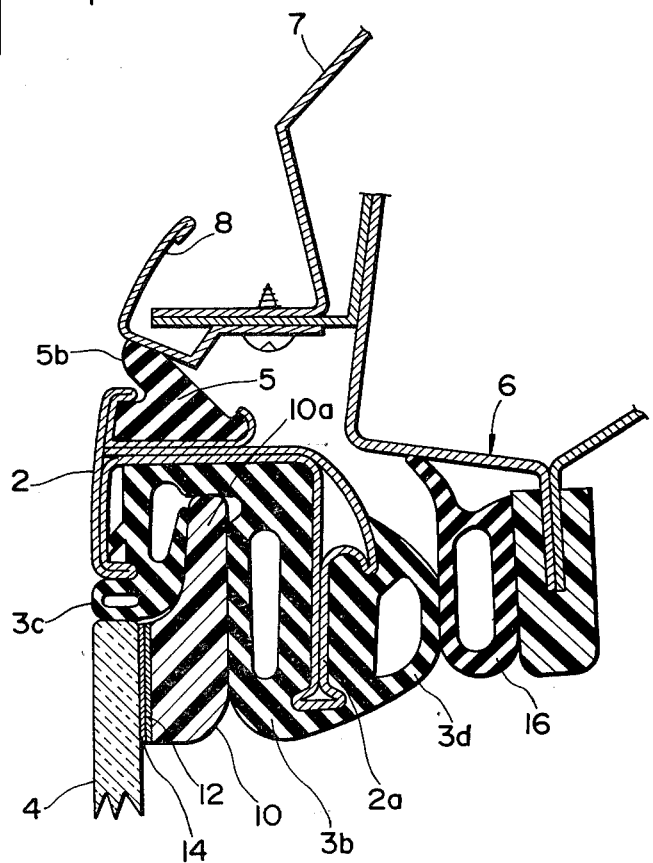
FIG. 5 is a cross-sectional view similar to FIG. 2 of a third example of a sealing structure.

FIG. 5 shows a third example. In this case, inward lip $3b$ of seal 3 extends along runner $10a$ to follow an extension $2a$ of sill frame 2 which lies inward of pane 4. Inward lip $3b$ continues around the end of extension $2a$ and forms a sealing gasket $3d$ on the inward surface thereof. Gasket $3d$ faces a similar sealing gasket 16 fixed to door frame 6 so that gaskets 3d and 16 come into sealing contact when door 1 is closed.

In the examples of FIGS. 3 to 5, visibility would not be optimum because of the provision for the guide member 10 extending along the upper and front oblique edge of the pane.

Figure 6:
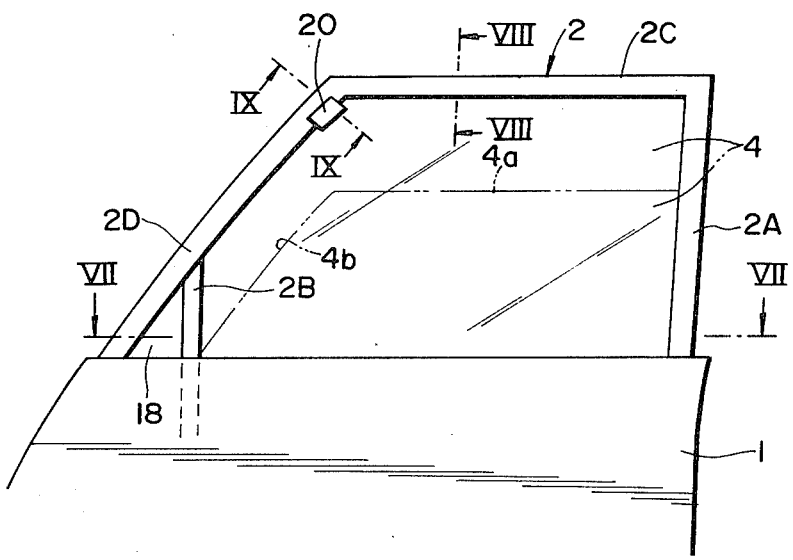
FIG. 6 is an elevation view of a portion of a vehicle door.

The embodiments of FIGS. 6 to 9 eliminate this drawback. As shown in FIG. 6, sill frame 2 consists of a rear vertical sash portion 2A, a front sash portion 2B, a top horizontal sash portion 2C, and a front oblique sash portion 2D connecting front sash portion 2B to top sash portion 2C. Pane 4 fits with sliding tolerance between sash portions 2A and 2B, and the top edges 4a and 4b thereof parallel the sash portions 2C and 2D, respectively. A vibration damper 20 disposed near the joint of sash portions 2C and 2D serves to stifle inward/outward vibrations of pane 4, as will be explained in more detail later.

Figure 7:
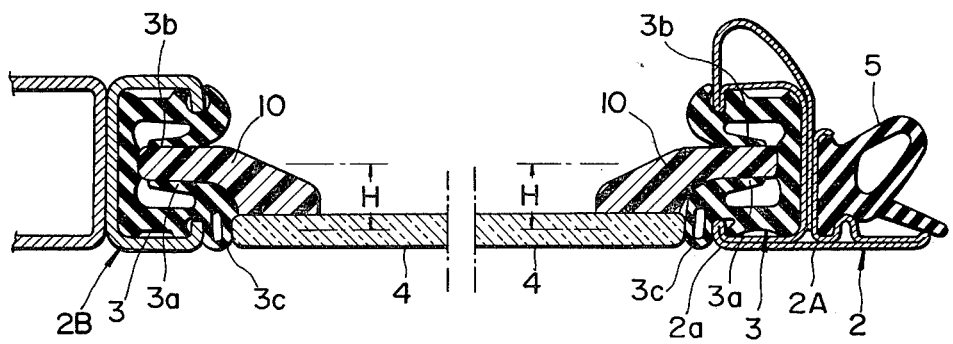
FIG. 7 is a cross-sectional view taken along line VII—VII in FIG. 6.

Sash portions 2A and 2B are equipped with sealing structures 3 such as are shown in FIG. 3. Accordingly, the vertical edges of pane 4, which will always be hidden from view, are equipped with rigid guide member 10, as shown in FIG. 7. Rear sash portion 2A also supports door weather stripping 5 since it comprises one edge of door 1. Front sash portion 2B, on the other hand, is bordered by a front wing window 18 and thus does not need weather stripping.

Figure 8:
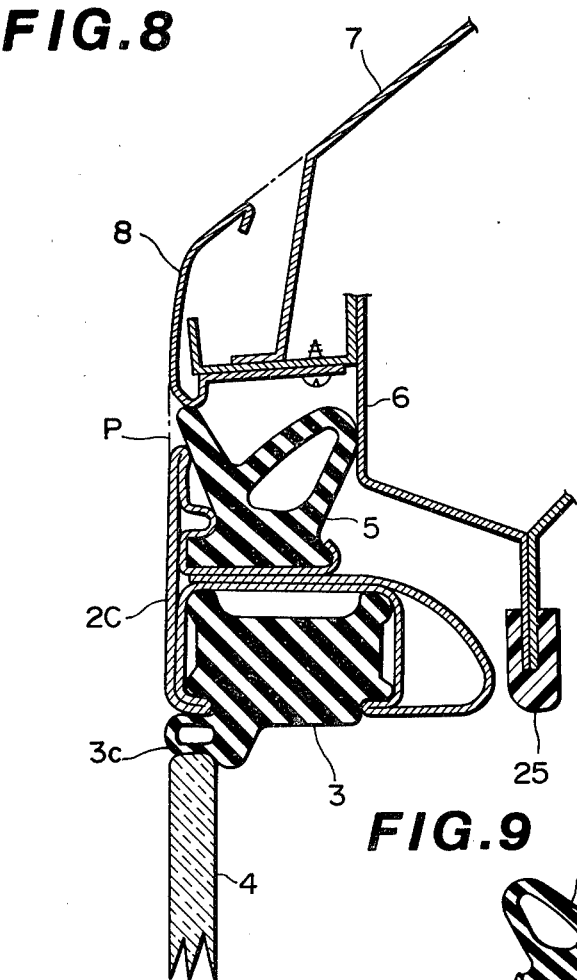
FIG. 8 is a cross-sectional view taken along line VIII—VIII in FIG. 6.

FIG. 8 shows a modified seal 3 suitable for use along most of sash portions 2C and 2D. In addition, FIG. 8 shows that the upper edges 4a and 4b of pane 4 are not provided with guides. This permits the highly visible upper edges 4a and 4b to have a clean, uncluttered appearance. The absence of guides also obviates the need for lips in the sealing member 3, so that seal 3 can simply consist of the pad 3c between sill frame 2 and pane 4 supported by a solid elastic base.

The guide members 10 along the vertical edges of pane 4 are sufficient to securely hold pane 4 with the sill 2. However, with no guides along the upper edges, it is likely that pane 4 will vibrate annoyingly unless somehow secured at the top. This is the purpose of vibration damper 20, shown in FIGS. 6 and 9.

Vibration damper 20 is secured to sill 2 near the joint between sash portions 2C and 2D in place of sealing member 3. Damper 20 consists of outward and inward flaps 20a and 20b, respectively, which join to form a downward-facing crotch at a base 20c attached to the outward edge of oblique sash portion 2D.

Figure 9:
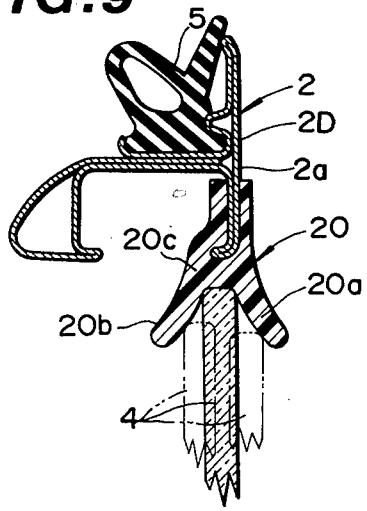
FIG. 9 is a cross-sectional view taken along line IX—IX in FIG. 6.

As pane 4 is raised from a lowered position, such as is shown with phantom lines in FIG. 6, the top edges 4a and 4b may be slightly out of alignment with the plane of the outward surface of sill frame 2, as shown in phantom lines in FIG. 9. However, when the pane 4 comes into contact with one of the resilient flaps 20a or 20b, it will be urged into alignment, and so as it is raised to its upper limit of travel, it will come to rest at the crotch in base 20c. Here, the top edges 4a and 4b will be held in alignment with the outward surface of sill frame 2 and will be prevented from vibrating in the inward/outward direction by the force of resilient flaps 20a and 20b. Thus, pane 4 can be securely held flush to the outer surface of the door without the need for an unsightly guide along its upper edges.

Although the invention has been described in terms of preferred embodiments, the invention should be considered to be limited thereto. Those skilled in the art will be capable of modifications hereof which will not depart from the scope of the invention, as set forth in the appended claims.

What is claimed is:

1. A sealing structure for a movable window in an automotive vehicle having a window sill frame which includes two substantially parallel vertical sash portions, an upper, horizontal sash portion and a slanted sash portion inclined to said upper, horizontal sash portion, said upper, horizontal sash portion being at one end connected to one of said two vertical sash portions and being at the other end connected to an upper end of said slanted sash portion, the other of said two vertical sash portions being connected at an upper end thereof to said slanted sash portion, the sealing structure comprising:

(a) a pane having two parallel vertical edges, the separation of which corresponds to the separation of the vertical sash portions, an upper, horizontal edge, the configuration of which corresponds to that of the upper, horizontal sash portion, and a slanted edge, the configuration of which corresponds to that of the slanted sash portion, the pane being adapted to be moved parallel to the direction in which the vertical sash portions extend;

(b) guide means secured to the inward surface of said pane near said vertical edges and having a runner projecting beyond said vertical edges and lying in a plane parallel to said pane and offset inwardly therefrom by a given distance;

(c) vertical sealing means disposed along the vertical sash portions for engaging said runner to retain said runner in a position offset inwardly from the outward surface of the window sill frame by the given distance;

(d) horizontal sealing means disposed along the horizontal sash portion for cushioning said horizontal edge from the horizontal sash portion;

(e) slanted sealing means disposed along the slanted sash portion for cushioning said slanted edge from the slanted sash portion; and (f) vibration damper means disposed on the upper end of the slanted sash portion for receiving a corresponding portion of said slanted edge and for elastically damping vibrations thereof, said vibration damper means comprising outwardly and inwardly extending resilient flaps joining to form an inverted V-shaped member fixed to the slanted sash portion, said corresponding portion of said slanted edge being received by said inverted V-shaped member so as to be retained by said flaps.

2. The sealing structure of claim 1, wherein said vertical sealing means includes outward and inward lips elastically separable to allow said runner to pass therebetween in a position a distance inward from the outward surface of the vertical sash portions.

3. The sealing structure of claim 1, wherein said guide means is fixed to said pane by means of adhesive, and a layer of decorative coloration is provided between said pane and said adhesive.

4. A sealing structure as claimed in claim 1, wherein said vehicle has a rain gutter panel spaced above said horizontal sash portion, the outboard surfaces of said rain gutter panel, said horizontal sash portion and said pane being substantially flush with each other, said sealing structure further including a weather stripping having a portion thereof filling the space between said rain gutter panel and said horizontal sash portion such that the outboard surface of said weather stripping is flush with the outer surfaces of said rain gutter and said horizontal sash portion.

* * * * *